Patented May 27, 1941

2,243,543

UNITED STATES PATENT OFFICE 2,243,543

PARASITICIDE

William P. ter Horst, Packanack Lake, N. J., assignor, by mesne assignments, to United States Rubber Company, New York, N. Y., a corporation of New Jersey No Drawing. Application October 14, 1938, Serial No. 234,953

9 Claims. (Cl. 167—30)

This invention relates broadly to materials for destroying or checking the growth and multiplication of living organisms, whether plant or animal, that are injurious to man. More particularly, the invention relates to parasiticides such as insecticides, mothproofing agents, repellents, fungicides and the like, and to parasiticidal compositions comprising the condensation products of aromatic hydrocarbons or of halogenated aromatic hydrocarbons and alkylene halides.

An object of the invention is to provide improved parasiticidal compositions, non-injurious to man and to foliage. Other objects will be apparent from the following description.

I have found that organic compounds, made by condensing aromatic hydrocarbons or their halogen derivatives with olefine-chlorides in the presence of a condensing agent such as aluminum chloride, are effective in killing insects and their larvae, whether applied externally or internally, and that such organic compounds are effective in reducing or preventing the germination of spores.

The chemicals or preparations containing the same may be sprayed on or dusted upon the material to be protected from injurious living organisms. They may, for example, be sprayed on or dusted upon foliage, fruit, vegetables, or upon non-living materials such as wood, leather, cotton, wool, rope, etc., or they may be incorporated into paints to render them mildewproof. These novel parasiticides can be used alone, or dissolved in suitable solvents or diluents, or they may be mixed with other active ingredients such as known stomach insecticides, contact insecticides, fungicides, repellents, bactericides, and the like.

For the purpose of this invention, an aromatic hydrocarbon such as benzol, or its homologs or analogs having one or more of its nuclear hydrogens replaced or not by chlorine, is reacted with an alkylene chloride. The reaction is preferably carried out in the presence of a condensing agent or a catalyst of the Friedel-Crafts type such as aluminum chloride or boron trifluoride. The molecular structure of the reaction products is unknown at the present time, but they are believed to contain linear polymers of varying length, of the general type . . . R.A.R.A.R.A . . ., in which R is the aromatic residue and A is alkylene, as well as lower molecular weight products of the type R—A—R, the latter being exemplified by dichloro diphenylethane. The resulting products are oily condensates or plastic materials or resinous materials, depending upon the conditions used. In general, a short reaction time tends to produce oily reaction products, whereas prolonged reaction times tend to produce resinous materials. The condensation of more than one mole of alkylene dichloride per mole of benzene or the like tends to result in the formation of resinous reaction products, whereas the condensation of less than one mole of the dichloride per mole of benzene tends to result in the formation of oily reaction products.

Besides benzol, there may be used chlorbenzol, dichlorbenzol, trichlorbenzol, benzylchloride, diphenyls, chlorinated diphenyls, as well as dibenzyl, toluol, xylol, ethyl benzol, naphthalene, etc., and the corresponding chlorinated derivatives. Any of these may be reacted with any of the alkylene chlorides, for example, methylene chloride, ethylene chloride, propylene chloride, amylene chloride, tetrachlor ethane, trichlor ethylene, chlorinated octanes, chlorinated decanes and chlorinated paraffin waxes.

The following examples illustrate preferred modes of preparing the parasiticides, although other methods may be used:

*Example 1.*—900 grams of benzol, 1200 grams of ethylene chloride, and 120 grams of aluminum chloride are heated during 1½ hours on a steam bath at 80–95° C. The reaction is then stopped by pouring the reaction mixture into water. One thousand cc. of benzol are added and the top layer, containing in solution the desired product is segregated. The benzol and unreacted reagents, as well as any dibenzyl or other low-boiling products which may have been formed, are removed by distillation. The oily condensate (516 grams) is then recovered by distillation under a pressure of 50 mm. (Hg.) at 225°–310° C.; the distillate is a pale straw colored viscous oil.

*Example 2.*—A mixture of 1200 parts of dry benzol and 2700 parts of amylene dichlorides (technical grade) is cooled to 30° C. and, with agitation, 160 parts of $AlCl_3$ are run in in the course of 2 to 3 hours while keeping the temperature at 30°–40° C. An exothermic reaction takes place, with evolution of HCl. The temperature is then gradually raised to 65–70° C. The reaction is stopped by the gradual addition of 2000 parts water to the reaction mixture which had previously been cooled to 30° C. The oily top layer is separated, dried with anhydrous $Na_2SO_4$, filtered and fractionally distilled. A yield of 1133 parts of oily condensate, boiling at 55°–315° C. at 50 mm. Hg. pressure, were obtained, which upon analysis was found to contain 10.9% of chlorine. The oily product had a specific gravity of .981, a refractive index of 1.5309 and a viscosity of 13.1 centipoises.

Example 3.—A mixture of 2130 parts of ethylene chloride and 1915 parts of monochlor-benzol is cooled to 30° C. 180 parts of anhydrous powdered aluminum chloride are added with agitation, and the temperature is slowly raised to 38° C. and kept there for six hours. The reaction time and the temperature may be varied according to the "activity" of the aluminum chloride used. Hydrochloric acid gas is evolved and may be absorbed in a suitable medium. At the end of approximately six hours, the mixture is cooled to 30° C. and water is added to stop the reaction. Approximately 2000 parts of water are used. The oily lower layer is separated and filtered. Unreacted ethylene chloride and chlorbenzol are removed by distillation. Approximately 1200 parts of crude reaction product remain, 89% of which can be vacuum distilled at 250–350° C. at 50mm.Hg. pressure. The distilled oil so obtained contains 27% chlorine, has a specific gravity of 1.202, a refractive index of 1.5907, and a viscosity of 17.5 centipoises.

The oils resulting from such processes as those of the preceding examples may be treated with chlorine as shown in the following Example 4.

Example 4.—Chlorine is introduced into 170 parts of the distilled oil of Example 3. An exothermic reaction takes place with evolution of hydrogen chloride. Chlorination is continued until the increase in weight amounts to approximately 16 parts. The oil is then washed with dilute caustic soda to remove dissolved hydrochloric acid gas. If desired, suitable catalysts such as iron may be used to accelerate the chlorination. The oil so obtained is largely distillable, and contains approximately 32.5% chlorine.

The reaction product of Example 3 was tested as an insecticide on black bean aphids (aphis rumicis) using as the host golden gleam nasturtium leaves. The oil was dissolved in corn oil containing 1% Emulphor A, a commercial emulsifying agent, in sufficient quantity to obtain a 10% solution. One part of this solution was emulsified in 100 parts of water. This emulsion when sprayed on nasturtium leaves containing black bean aphids shows a high degree of toxicity towards these insects. Out of 1266 insects, 924 were dead after 24 hours, equivalent to a 72.9% kill.

In another experiment, a 15% solution of the oil of Example 3, in corn oil containing 4% of Emulphor A, when emulsified in water in the ratio of 1–100 showed a 91.1% kill of aphids at the end of 24 hours, and when diluted to a ratio of 1–200, still gave a 77.3% kill, showing its effectiveness in low concentrations.

The oil described under Example 2 gives an 87.8% kill of aphids when a 25% solution in corn oil containing 4% Emulphor A is emulsified in water in the ratio of 1–100 on leaves containing black bean aphids, and a 75.8% kill in a dilution of 1–200. In the control test, 495 untreated insects were used, and at the end of 24 hours only 3 had died—a mortality of .3%. The oil described under Example 4, when tested under similar conditions, gives an 89.3% kill in a dilution of 1–100, and a 66.3% kill in a dilution of 1–200.

The oils described in the foregoing examples also show high toxicity to meal worm larvae (Tenebrio molitar). Solutions were made up of equal amounts of the materials described under Examples 2, 3 and 4 in corn oil or in white oil. Three droplets of such solutions were applied to the ventral thoracic area of meal worm larvae with a platinum needle. At the end of five minutes paralysis commenced and the activity of the larvae decreased. At the end of 48 hours, all larvae were dead, whereas in control tests all larvae remained normal.

The oil described under Example 3 shows remarkable properties as a mothproofing agent. Strips of wool cloth were soaked in a 5% solution of the oil in kerosene. The cloth strips were placed in boxes and larvae of the black carpet beetle were added to each box. The degree of feeding was noted weekly for three weeks. Whereas the untreated cloth showed heavy feeding by the carpet beetle larvae, the treated cloth showed practically no feeding.

The oils of Example 3 and 4 were tested as stomach poisons and as repellents for the Mexican bean beetle larvae, using as the host snap bean foliage. The oil of Example 3 was emulsified with the aid of approximately 1% Emulphor O, a commercial wetting agent, using a ratio of 1 part of oil to 25 parts of water. Five Mexican bean beetle larvae were used in each test, the emulsion being applied by spraying. At the end of 24 hours, all five of the larvae were dead, and no weighable amount of foliage had been eaten. In a corresponding test with the oil of Example 4, two of the larvae were dead at the end of 24 hours and four were dead at the end of 72 hours. Here again, practically no foliage had been eaten.

The oil of Example 3 was tested in a similar manner as an insecticide for Colorado potato beetle larvae. Out of 10 larvae, 9 had died at the end of 24 hours and all 10 were dead at the end of 48 hours, as the result of spraying the foliage with an emulsion of 1 part of the oil in 10 parts of water. One percent of the foliage had been eaten at the end of 48 hours. In a control test, the 10 untreated larvae were still alive at the end of 48 hours and 70% of the foliage had been eaten.

The oil of Example 4 gives excellent results when used as a fungicide. Using as the test organism Macrosporium sarcinaeforme, practically complete inhibition of spore germination was shown.

The products described herein are generally completely soluble in petroleum oils, and may be used in cattle sprays, fly sprays, and the like. Either the distilled products or the crude washed products may be used. The products may be dissolved, emulsified, or suspended in liquid media, or they may be mixed with or adsorbed upon powdered inert carriers such as clay, flour, diatomaceous earth, talc, and the like.

Having thus described my invention, what I claim and desire to protect by Letters Patent is:

1. A parasiticidal preparation containing as an active constituent a composite oily to resinous distillable product resulting from condensing an aromatic compound selected from aromatic hydrocarbons and nuclear-halogen substitution products thereof with an alkylene halide.

2. A parasiticidal preparation containing as an active constituent a composite oily to resinous distillable product resulting from condensing an aromatic compound selected from aromatic hydrocarbons and nuclear-halogen substitution products thereof with an alkylene chloride.

3. A parasiticidal preparation containing as an active constituent a composite oily to resinous distillable product resulting from condensing an aromatic hydrocarbon having at least one of its nuclear hydrogens replaced by chlorine, with an alkylene halide.

4. A parasiticidal preparation containing as an active constituent a composite oily to resinous distillable product resulting from condensing a benzol compound selected from benzene hydrocarbons and nuclear-halogen substitution products thereof with an alkylene halide.

5. A parasiticidal preparation containing as an active constituent a composite oily to resinous distillable product resulting from condensing a benzol compound selected from benzene hydrocarbons and nuclear-halogen substitution products thereof with an alkylene chloride.

6. A parasiticidal preparation containing as an active constituent a composite oily to resinous distillable product resulting from condensing a benzol compound with an alkylene halide, and subsequently halogenating the condensation product.

7. A parasiticidal preparation containing as an active constituent a composite oily to resinous distillable product resulting from condensing benzol with an amylene dichloride.

8. A parasiticidal preparation containing as an active constituent a composite oily to resinous distillable product resulting from condensing monochlor-benzol with ethylene chloride.

9. A parasiticidal preparation containing as an active constituent a composite oil to resinous distillable product resulting from condensing monochlor-benzol with ethylene chloride, and subsequently halogenating the condensation product.

WILLIAM P. ter HORST.